United States Patent

[11] 3,587,240

| [72] | Inventors | Allan Martindale<br>Bramhall;<br>John T. Allanson, Didsbury, Manchester;<br>Bryan R. Parr, Sale, England |
|---|---|---|
| [21] | Appl. No. | 636,817 |
| [22] | Filed | May 8, 1967 |
| [45] | Patented | June 28, 1971 |
| [32] | Priority | May 25, 1966 |
| [33] | | Great Britain |
| [31] | | 23340/66 |
| [73] | Assignee | Simon-Carves Limited<br>Stockport, Chesire, England |

[54] DESALINATION
20 Claims, 3 Drawing Figs.

[52] U.S. Cl. .................................... 62/58, 62/123
[51] Int. Cl. .................................... B01d 9/04, C02b 1/06
[50] Field of Search .......................... 62/123, 124; 62/58

[56] References Cited
UNITED STATES PATENTS

| 3,027,320 | 3/1962 | Buchanan.................. | 62/58X |
| 3,098,734 | 7/1963 | Svanoe...................... | 62/123X |
| 3,137,554 | 6/1964 | Gilliland et al. ............ | 62/123X |
| 3,170,778 | 2/1965 | Roth........................... | 62/58 |
| 3,240,024 | 3/1966 | Ashley et al. ............... | 62/58 |
| 3,364,690 | 1/1968 | Torobin...................... | 62/58 |
| 3,251,192 | 5/1966 | Rich, Jr. et al.............. | 62/58 |

Primary Examiner—Wilbur L. Bascomb, Jr.
Assistant Examiner—R. T. Foster
Attorney—Norris and Bateman ABSTRACT: A method of desalinating saline water to produce fresh water comprising the steps of (a) injecting into the saline water a volatile liquid refrigerant immiscible with water, so that the refrigerant boils, causes ice crystals to form and causes circulation of a slurry of ice crystals around a baffle, (b) separating the ice crystals from their mother liquor, and (c) melting the separated ice crystals.

DESALINATION

BACKGROUND

This invention is concerned with improvements in or relating to desalination.

Shortage of fresh water is an increasing world problem and it has been previously proposed to produce fresh water from, for example, sea water, by various methods of desalination. One previously proposed method includes the steps of forming ice crystals from the sea water, separating the ice crystals from their mother liquor, and melting the separated ice crystals; the melted ice yielding water of lower salt concentration than the original sea water.

SUMMARY

It is an object of the invention to provide improved desalination plant.

It is another object of the invention to provide an improved method of desalinating saline water to produce fresh water.

Sea water usually has a salt concentration of about 35,000 parts per million by weight and to render it fit for drinking purposes it is, for example, desalinated to a salt concentration of not more than 500 p.p.m., preferably not more than 300 p.p.m.; for other purposes however a higher salt concentration may be acceptable.

The invention provides desalination plant comprising (a) a container for saline water, (b) means for injecting volatile liquid refrigerant into the container, (c) baffle means mounted in the container; the arrangement being such that in the operation of the plant volatile liquid refrigerant, immiscible with water, is injected into the container, boils, causes ice crystals to form, and causes circulation of a slurry of ice crystals in turbulent flow around the baffle means, (d) means for separating the ice crystals from their mother liquor, and (e) means for melting the separated ice crystals.

The invention also provides desalination plant comprising (a) a container for saline water, (b) an upright baffle mounted in the container and spaced from a base wall of the container and also spaced from a sidewall of the container which baffle is submerged in saline water in the operation of the plant, (c) means located to one side of the baffle for injecting a volatile liquid refrigerant for flow up past the baffle, (d) means for separating the ice crystals from their mother liquor, and (e) means for melting the separated ice crystals.

The invention also provides desalination plant comprising (a) a container for saline water, (b) an upright baffle tube mounted in the container and spaced from a base wall of the container and also spaced from a sidewall of the container, which baffle tube is submerged in saline water in the operation of the plant, (c) means for injecting a volatile liquid refrigerant for flow up along the baffle tube, (d) means for separating the ice crystals from their mother liquor, and (e) means for melting the separated ice crystals.

The invention also provides a method of desalinating saline water to produce fresh water comprising the steps of (a) injecting into the saline water a volatile liquid refrigerant immiscible with water, so that the refrigerant boils, causes ice crystals to form and causes circulation of a slurry of ice crystals around a baffle, (b) separating the ice crystals from their mother liquor, and (c) melting the separated ice crystals.

The invention also provides fresh water when produced by a method as set out in the last preceding paragraph.

DRAWINGS

There now follows a description, to be read with reference to the drawings, of desalination plant embodying the invention. This description is given by way of example of the invention only and not by way of limitation thereof. The operation of the plant is also illustrative of method aspects of the invention.

DESCRIPTION

Figure 1:
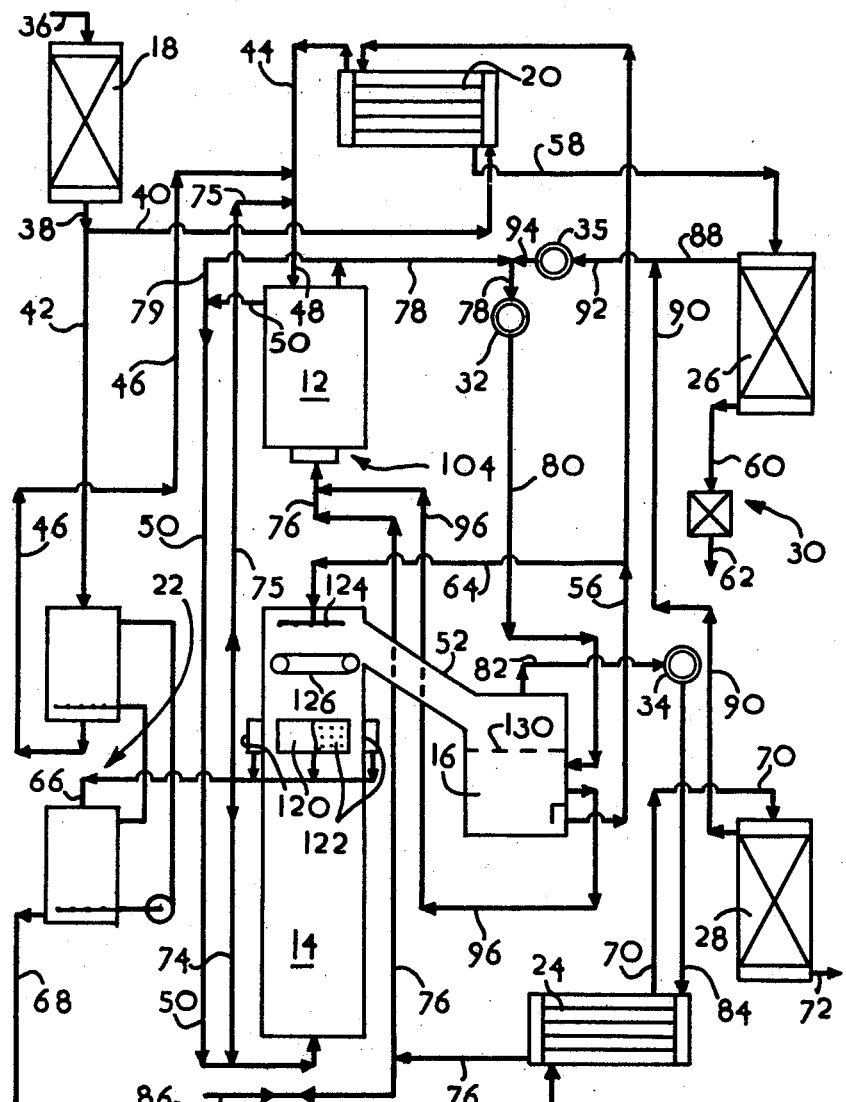
FIG. 1 shows a flow diagram of the desalination plant.

The desalination plant is adapted for use in desalinating sea water to produce fresh water, by forming ice crystals from the sea water, separating the ice crystals from their mother liquor and melting the separated ice crystals to provide the fresh water.

The plant comprises a freezer/crystallizer 12 adapted for use in forming ice crystals from sea water by direct contact refrigeration with boiling n-butane, a generally hollow wash/separator column 14 arranged to separate the ice crystals from their mother liquor and to wash adhering saline water from the ice crystals, and a melter 16 arranged to melt the ice crystals separated in the column 14.

The plant also comprises a deaerator 18, heat exchangers 20, 22, 24, debutanisers 26, 28, an absorber 30, and compressors 32, 34, 35; all these items of equipment are of known type per se.

In the operation of the plant raw sea water passes continuously along a line 36 to the deaerator 18 where it is deaerated. The deaerated sea water is pumped from the deaerator 18 along a line 38 which leads to lines 40, 42 leading to the heat exchangers 20, 22 respectively; the heat exchanger 20 is of the indirect type and the sea water is cooled therein by indirect heat exchange with product water from the melter 16; the heat exchanger 22 is of the double direct contact type employing an intermediate heat exchange liquid immiscible with water, and the sea water is cooled therein by heat exchange with reject saline water from the column 14. The cooled sea water leaves the heat exchangers 20, 22 by lines 44, 46 respectively which both lead into a line 48 leading into the freezer/crystallizer 12. In the freezer/crystallizer 12 ice crystals are produced by direct contact of saline water with boiling n-butane, and a slurry of ice crystals in saline water leaves the freezer/crystallizer 12 along a line 50 which leads to the column 14. Ice crystals separated in the column 14 are directed down a chute 52 into the melter 16 where the ice crystals are melted by direct contact with warm butane vapor. The water resulting from melting of the ice crystals passes from the melter 16 along a line 56 which leads to the heat exchanger 20. From the heat exchanger 20 the water passes along a line 58 to the debutaniser 26 where small quantities of suspended and dissolved butane are removed from the water. From the debutaniser 26 the water passes along a line 60 to the adsorber 30 where trace quantities of butane are removed by adsorption on charcoal. The product fresh water leaves the plant along a line 62 leading from the adsorber 30.

Wash water for the column 14 is taken from the line 56 along a line 64. The reject saline water from which ice crystals have been separated leaves the column 14 along a line 66 which leads to the heat exchanger 22. The saline water leaves the heat exchanger 22 along a line 68 which leads to the heat exchanger 24 which is of the indirect contact type; in the heat exchanger 24 butane is cooled and condensed by heat exchange with the saline water. The saline water leaves the heat exchanger 24 along a line 70 which leads to the debutaniser 28 which recovers suspended and dissolved butane from the saline water. The saline water is rejected from the plant along a line 72 which leads from the debutaniser 28. Some saline water from the line 66 is recycled along a line 74 to the line 50 which leads into the column 14, and some is recycled along a line 75 which leads into the line 48 which leads into the freezer/crystallizer 12.

Butane for the production of ice crystals in the freezer/crystallizer 12 is pumped continuously round the plant in a closed cycle in the operation of the plant. Liquid butane enters the freezer/crystallizer 12 along lines 76, 96 and butane vapor leaves the freezer/crystallizer 12 along a line 78 leading to the compressor 32; the line 50 is vented into the line 78 by a line 79. From the compressor 32 warm butane vapor passes along a line 80 to the melter 16 where it is cooled and partially condensed by direct contact with the ice crystals which are melted. Butane vapor leaves the melter 16 along a line 82 which leads to the compressor 34. The vapor leaves the compressor 34 along a line 84 which leads to the heat exchanger 24 where the butane is cooled and condensed by indirect heat exchange with reject saline water from the heat exchanger 22; from the heat exchanger 24 liquid butane passes to the freezer/crystallizer 12 along the line 76. Butane make-up enters the line 76 along a line 86 as required. Butane vapor leaves the debutanisers 26, 28 along lines 88, 90 respectively which lead into a line 92 leading to the compressor 35; from the compressor 35 a line 94 leads into the line 78. Liquid butane condensed in the melter 16 leaves the melter 16 along the line 96 and is recycled to the freezer/crystallizer 12 along the line 96.

The freezer/crystallizer 12 (FIGS. 2 and 3) comprises an upright circular cylindrical container 100 which, in the operation of the plant, contains a slurry of saline water and ice generally up to a level L. The line 50 leads out of the container 100 at the level L. The line 48 leads into the container 100 trough an upper wall 102 of the container 100 and close to a peripheral wall 114 thereof; the line 78 leads out of the container 100 axially through the upper wall 102. The lines 96 and 76 lead to a liquid butane distributor 104 which comprises four vertical nozzles 106 which extend through a lower wall 108 of the container 100; the nozzles 106 are symmetrically arranged about the axis of the container 100. The freezer/crystallizer 12 also comprises baffle means comprising an upright circular cylindrical baffle tube 110 mounted axially in the container on legs 112 which are secured to the wall 108. The baffle tube 110 is located below the level L, is spaced from the wall 108 and is also spaced from the wall 114; the line 48 extends into the space between the baffle tube 110 and the wall 114. The nozzles 106 lie, in plan view, to the inside of the tube 110 well within its periphery.

In the operation of the plant, a slurry of ice crystals in saline water is kept continuously circulating in the container 100 in turbulent flow by the action of liquid butane continuously injected through the nozzles 106 for flow up along the baffle tube 110; the circulation takes place around the tube 110 as follows: up along the inside of the tube 110, down along the space between the tube 110 and the wall 114 and again into the tube 110 for flow up therealong: this is indicated by arrows in FIG. 2. During circulation the ice crystals are uniformly distributed in the slurry. Saline water enters the container 100 continuously along the line 48 and slurry leaves continuously along the line 50. The liquid butane boils in the slurry causing cooling and formation of ice crystals, and butane vapor leaves continuously along the line 78.

The column 14 (FIG. 1) is of rectangular cross section (not shown) and comprises four drain boxes 120 (only three of which are shown) located adjacent sidewalls of the column 14 and each communicating with the line 66; each of the drain boxes 120 comprises a drain wall 122 which provides communication between the box 120 and a chamber provided by the hollow interior of the column 14. The column 14 also comprises a spray device 124 in communication with the line 64 and arranged to spray water derived from the melter 16 and an endless belt scraper 126 adjacent the chute 52.

In the operation of the plant a bed of ice crystals and saline water rises slowly continuously up along the chamber provided by the interior of the column 14 and saline water drains laterally through the drain walls 122 and drain boxes 120 into the line 66. The scraper 126 continuously scrapes ice crystals from the top of the bed into the chute 52 to direct the crystals towards the melter 16 and fresh water is sprayed continuously onto the rising bed by the spray device 124 to wash adhering saline water off the ice crystals; most of the wash water leaves the column 14 with the ice crystals entering the chute 52.

The melter 16 comprises a grid 130 onto which the ice crystals passing down the chute 52 are dumped in the operation of the plant. Butane vapor from the line 80 enters the melter 16 below the grid 130 and is contacted with the ice crystals on the grid 130. Water melted from the ice crystals and condensed butane collect in two layers below the grid 130 and are drawn off from the separate layers along the lines 56, 96, respectively.

It is preferred to operate the plant to give a recovery rate of fresh water of between 20 percent and 50 percent of the input of sea water, more preferably about 40 percent.

In modified forms of the plant one or more of the following modifications are made:
a. the heat exchanger 20 is replaced by one of the double direct contact type:
b. the heat exchanger 22 is replaced by one of the indirect type: and
c. the heat exchanger 24 is replaced by one of double direct contact type.

EXAMPLE

Figure 2:
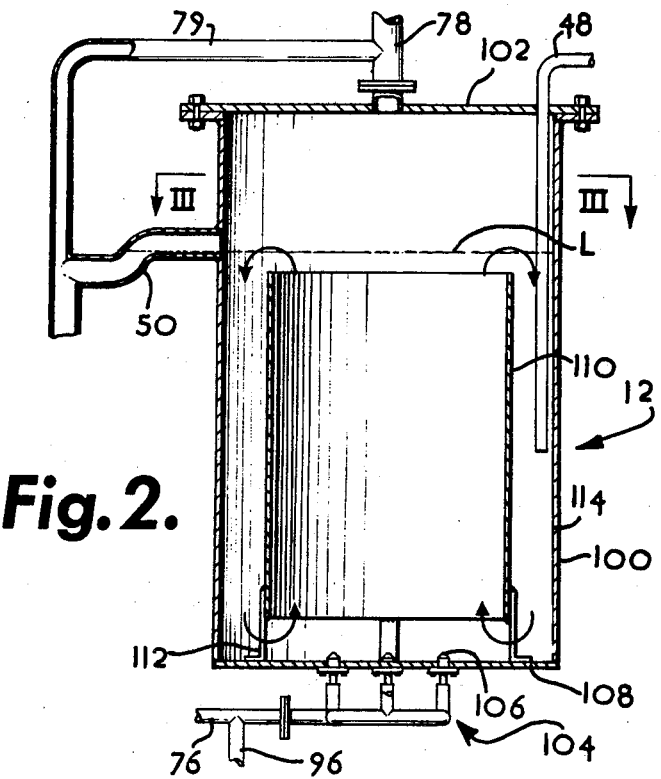
FIG. 2 shows a sectional view of a freezer/crystallizer of the plant.
Figure 3:
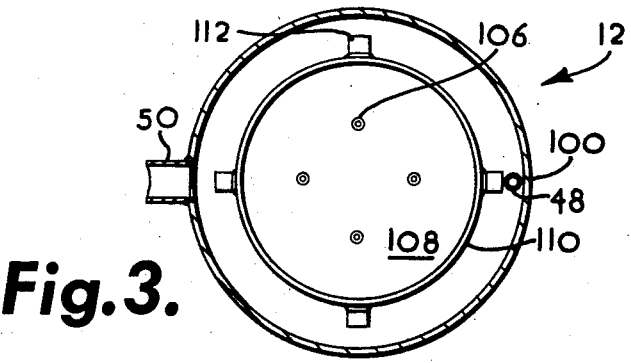
FIG. 3 shows a section on the line III-III of FIG. 2.

Ice crystals were formed from sea water in a freezer/crystallizer substantially as shown in FIGS. 2 and 3, the capacity of which up to the general liquid level (L) was about 20 lbs. of slurry. The ice crystals were separated from their mother liquor in a wash/separator column substantially as shown in FIG. 1. The ice crystals were then melted.

The conditions and results were as follows;
Sea water feed : flow rate: 90 lbs./hour
  : salt concentration: 35,000 p.p.m.
  : temperature immediately prior to entering freezer/crystallizer: 10° C.
Butane : flow rate: 40 lbs./hour (this is in excess of theoretical requirements because of heat losses)
  : boiling temperature: minus 2.45° C.
Reject brine : recycle rate to sea water feed: 25 lbs./hour
  : salt concentration: 44,000 p.p.m.
  : recycle rate to inlet of wash/separator column: nil
Ice crystals : flat discs 1—2 m.m. in diameter and of thickness about one-fifth of their diameter.
Product water : overall yield: 18 lbs./hour
  : recycle for washing ice crystals: 24 lbs./hour
  : salt concentration: 500 p.p.m. Retention in freezer/crystallizer: 10 minutes. Equilibrium temperature in freezer/crystallizer: minus 2.45° C.

It will be seen that an overall recovery of fresh water of 20 percent of the sea water feed was obtained, with a salt concentration in the fresh water of 500 p.p.m.

We claim:

1. Desalination plant comprising (a) an enclosed container for a body of saline water, (b) substantially vertical baffle means mounted in the container so as to be totally immersed in said body of saline water, said baffle means being spaced from at least the top and bottom internal surfaces of said container so as to define a path within said body of saline water around said baffle means, (c) means for injecting volatile liquid refrigerant immiscible with water directly into the saline water in the container at one side only of said baffle means in such manner that the refrigerant boils within said body of water on said one side and said boiling causes ice crystals to form in the saline water, said boiling action causing continuous circulation of a slurry of ice crystals in turbulent flow in said path through said body around the baffle means, (d) means for separating the ice crystals from the slurry, and (e) means for melting the separated ice crystals to produce substantially desalinated water.

2. Desalination plant as defined in claim 1 wherein said baffle means is tubular and said injection means discharges said refrigerant into the interior of said tubular baffle means.

3. Plant according to claim 1 wherein the separating means comprises a chamber up along which a bed of ice crystals rises in the operation of the plant, a drainage device located adjacent a sidewall of the chamber adapted to drain water laterally from the rising bed, a scraper device adapted to scrape ice crystals from the top of the bed and to direct them towards the melting means, and a spray device adapted to spray fresh water onto the rising bed to wash adhering saline water off the ice crystals.

4. Desalination plant as defined in claim 1, wherein means is provided for continuously diverting part of the desalinated water back into said separation means for providing wash water for the ice crystals.

5. In the desalination plant defined in claim 1, means for recycling a part of the rejected saline water from which ice crystals have been separated in said separation means back into said separation means.

6. In the plant defined in claim 1, means defining a circuit wherein said refrigerant is separated from the water after extraction of the ice crystals and recycled and treated for reinjection into said container, said circuit including a heat exchanger, and there being means conducting rejected saline water from said separation means to said heat exchanger for heat exchange association with the refrigerant.

7. Desalination plant as recited in claim 1, wherein said baffle means is an open ended upright tube fixed within the container, and said refrigerant is discharged through directional flow control nozzle means in the lower end of said container directly into the interior of said tube.

8. Desalination plant as recited in claim 7, wherein said nozzle means is disposed at the lower open end of said tube, and means is provided adjacent the upper end of said tube for withdrawing slurry for transmission to said separation means.

9. A method of desalinating saline water to produce fresh water comprising the steps of providing a body of saline water within an enclosed zone, said zone containing a substantially vertical baffle totally immersed in said saline water so as to define a path within the body around said baffle, injecting a volatile liquid refrigerant immiscible with water directly into said saline water at one side only of said baffle in such manner that the refrigerant boils at said one side of the baffle and said boiling causes ice crystals to form in the saline water, said boiling action resulting in circulation of a slurry of ice crystals in said path around said baffle, separating ice crystals from said slurry, and melting the separated ice crystals to produce substantially desalinated water.

10. A method according to claim 9 wherein the baffle is a tube and the flow of injected refrigerant is up along the inside of the tube.

11. A method according to claim 9 wherein the separation step is carried out by draining water laterally from a rising bed of ice crystals and spraying fresh water onto the bed to wash adhering saline water off the ice crystals.

12. A method according to claim 9 wherein refrigerant vapor from the injection step is compressed, and in the melting step ice crystals are melted by direct contact with the compressed vapor, and liquefied refrigerant resulting from said direct contact is recycled to the injection step.

13. A method according to claim 9 wherein small quantities of suspended and dissolved refrigerant are removed from water resulting from melting the separated ice crystals.

14. A method according to claim 9 wherein the refrigerant comprises $n$-butane.

15. A method according to claim 9 wherein the water is desalinated to a salt concentration of not more than 500 parts per million by weight.

16. A method according to claim 15 wherein the water is desalinated to a salt concentration of not more than 300 parts per million by weight.

17. A method according to claim 9 wherein the saline water is sea water.

18. A method according to claim 17 wherein the salt concentration of the sea water is 35,000 parts per million by weight.

19. A method according to claim 9 wherein the recovery rate of fresh water is between 20 percent and 50 percent of the input of saline water.

20. A method according to claim 19 wherein the recovery rate is 40 percent.